J. ALBRECHT.
TAPE CONTROLLED MEASURING PUMP.
APPLICATION FILED DEC. 27, 1909.

968,827.

Patented Aug. 30, 1910.
4 SHEETS—SHEET 1.

WITNESSES.

INVENTOR
John Albrecht.
By Benedict, Morsell & Caldwell
ATTORNEYS.

J. ALBRECHT.
TAPE CONTROLLED MEASURING PUMP.
APPLICATION FILED DEC. 27, 1909.

968,827.

Patented Aug. 30, 1910.
4 SHEETS—SHEET 2.

WITNESSES.

INVENTOR.
John Albrecht.
By Benedict, Morsell & Caldwell
ATTORNEYS.

J. ALBRECHT.
TAPE CONTROLLED MEASURING PUMP.
APPLICATION FILED DEC. 27, 1909.

968,827.

Patented Aug. 30, 1910.
4 SHEETS—SHEET 3.

WITNESSES.

INVENTOR.
John Albrecht
By Benedict, Morsell & Caldwell
ATTORNEYS.

J. ALBRECHT.
TAPE CONTROLLED MEASURING PUMP.
APPLICATION FILED DEC. 27, 1909.
968,827.
Patented Aug. 30, 1910.
4 SHEETS—SHEET 4.
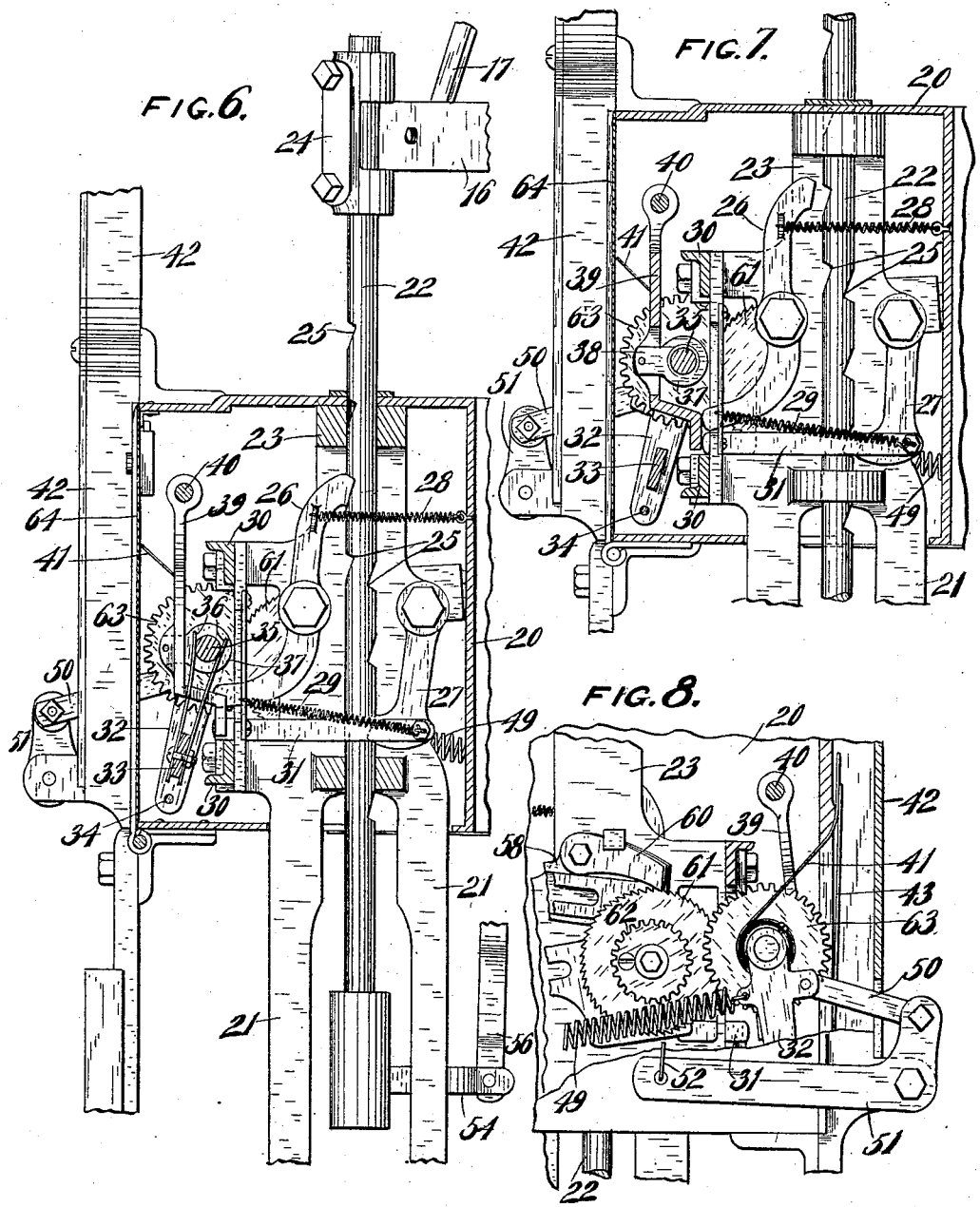
WITNESSES
INVENTOR.
John Albrecht,
By Benedict, Morsell & Caldwell.
ATTORNEYS.

UNITED STATES PATENT OFFICE.

JOHN ALBRECHT, OF KEWAUNEE, WISCONSIN, ASSIGNOR TO THE ALBRECHT MANUFACTURING COMPANY, OF KEWAUNEE, WISCONSIN, A CORPORATION OF WISCONSIN.

TAPE-CONTROLLED MEASURING-PUMP.

968,827.     Specification of Letters Patent.     Patented Aug. 30, 1910.

Application filed December 27, 1909. Serial No. 535,009.

*To all whom it may concern:*

Be it known that I, JOHN ALBRECHT, residing in Kewaunee, in the county of Kewaunee and State of Wisconsin, have invented new and useful Improvements in Tape-Controlled Measuring-Pumps, of which the following is a description, reference being had to the accompanying drawings, which are a part of this specification.

This invention has for its object to provide a measuring pump mechanism which may be controlled from a distance by a tape so as to accurately determine the amount of skim milk or whey permitted to be pumped by the patron of a creamery or cheese factory in partial exchange for whole milk delivered by him, the amount of liquid drawn from the pump being varied at the will of the weigher so as to be proportionate to the quantity of whole milk received from the patron, and the pump becoming automatically locked when the quantity which it has been set to deliver has been drawn therefrom.

With the above and other objects in view the invention consists in the tape controlled measuring pump herein claimed, in the construction and relative arrangement of certain parts and in combinations of parts hereinafter particularly described and pointed out in the claims.

In the accompanying drawing is shown an exemplifying structure embodying the invention, but it is to be understood that the invention is capable of embodiment in different forms and of adaptation for various uses.

Figure 1:
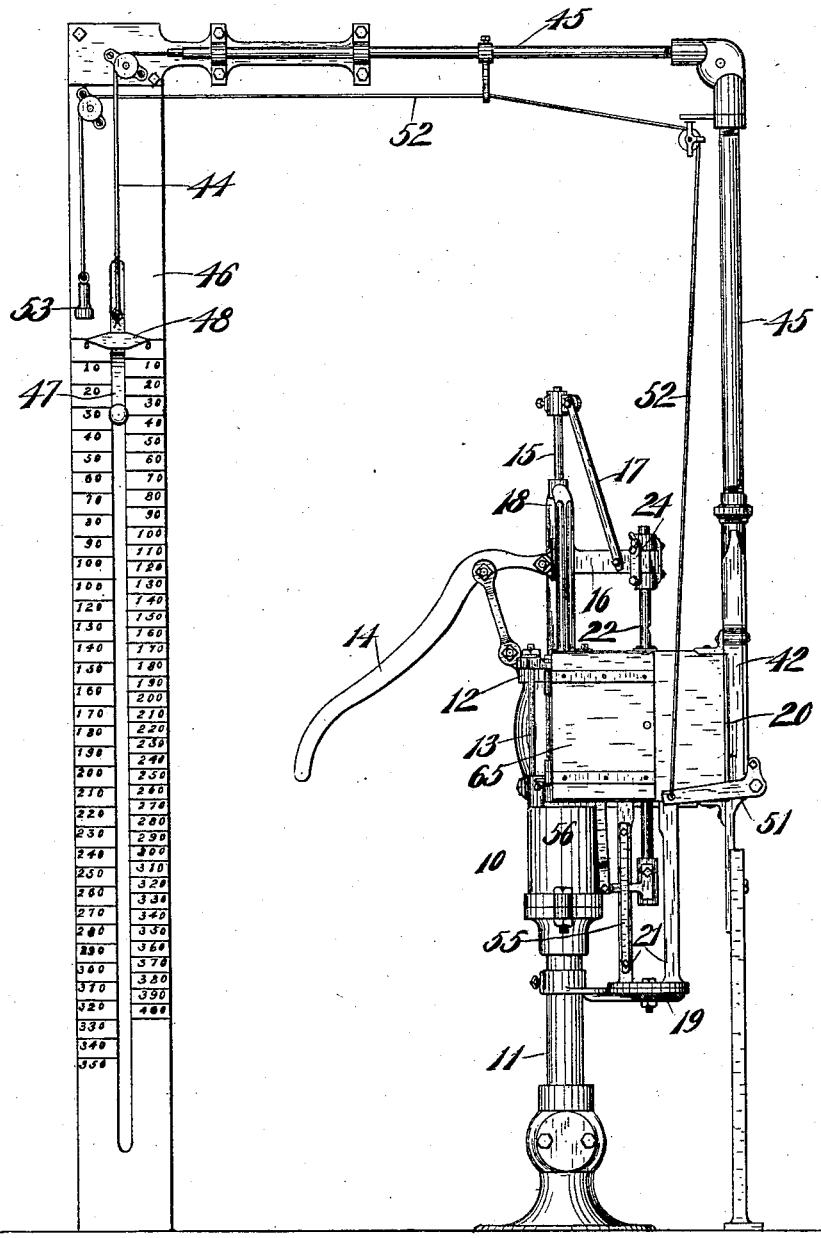
Figures 2, 3:
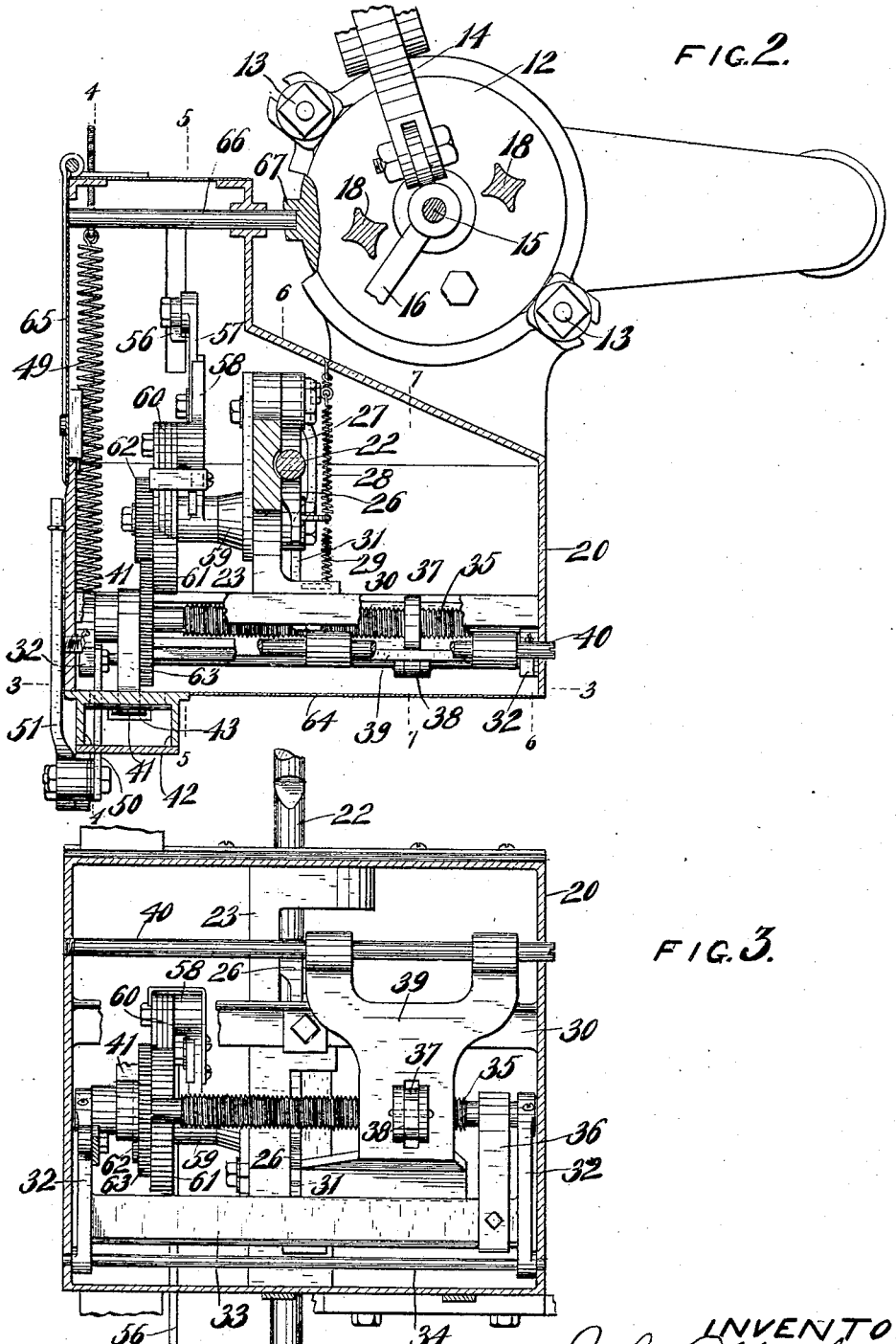
Figure 4:
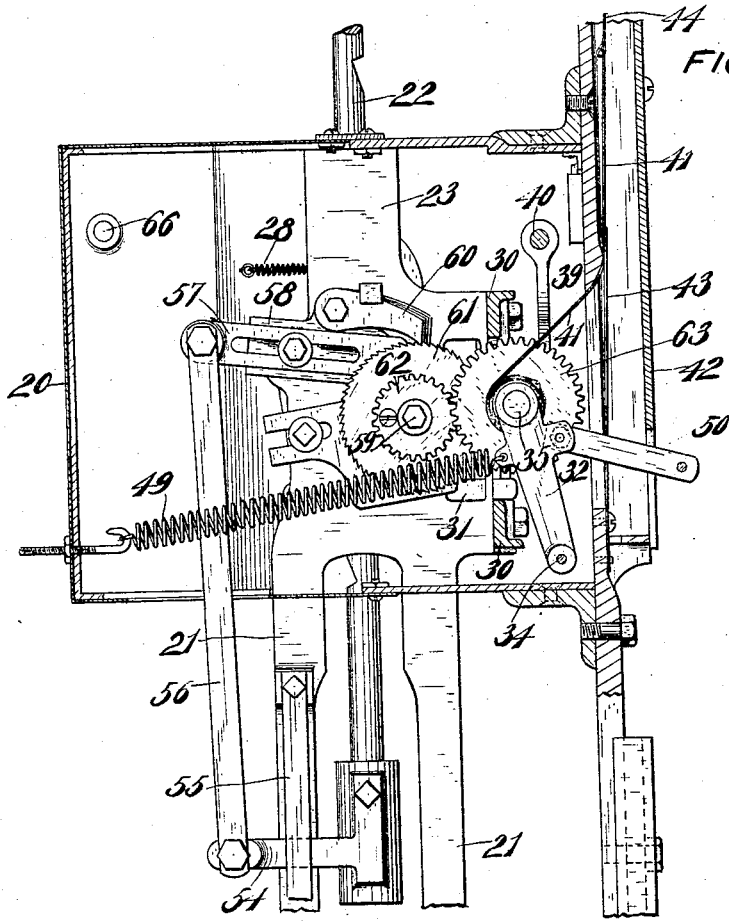
Figure 5:
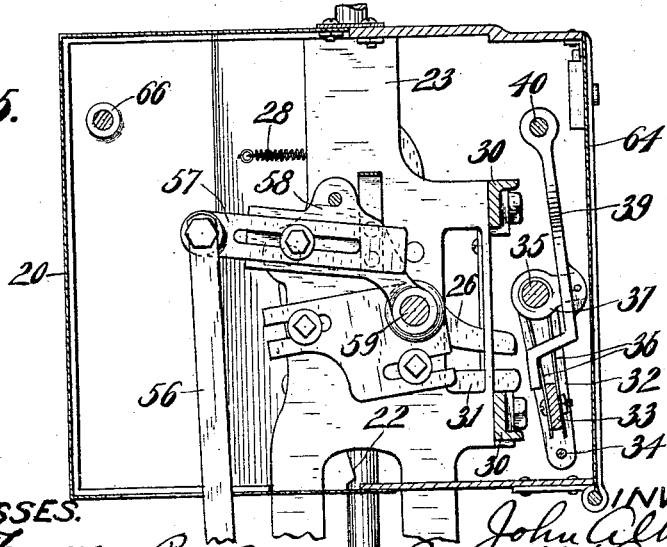

Referring to the accompanying drawings in which like characters of reference indicate the same parts in the different views: Figure 1 is an elevation of a tape controlled measuring pump constructed in accordance with this invention with the gage connected thereto; Fig. 2 is a sectional plan view thereof; Fig. 3 is a sectional elevation of the locking mechanism on the sectional plane of line 3—3 of Fig. 2; Fig. 4 is a similar view on the plane of line 4—4 of Fig. 2; Fig. 5 is a view similar to Fig. 4 on the plane of line 5—5 of Fig. 2; Fig. 6 is a similar view on the irregular sectional plane of line 6—6 of Fig. 2; Fig. 7 is a view similar to Fig. 6 with parts sectioned on the plane of line 7—7 of Fig. 2; and, Fig. 8 is a view similar to a part of Fig. 4, showing the parts in a position for setting the carriage by means of the tape.

In these drawings 10 indicates a pump proper mounted on a suitable pedestal 11 and having its top or cap portion 12 secured in place by means of bolts 13, the operating handle 14 being pivotally supported on said cap portion. The plunger rod 15 of the pump has securely fastened to it a bracket arm 16 with preferably a brace connection 17 from its outwardly extended end to the upper end of the plunger rod 15 above the guide 17 for said plunger rod which is carried by the cap portion 12 of the pump.

The details of pump construction are not essential to the invention, but are briefly mentioned in order to show the locking connection of the controlling means therewith.

A base plate 19 is adjustably secured to the trunk portion of the pump pedestal 11 so as to stand at the desired elevation and at the proper angle with relation to the pump parts for the support of the controlling mechanism which is contained within a box like frame 20 supported on the base plate 19 by means of standards 21. A locking rod 22 passes vertically through the casing 20 and is guided in upper and lower bearings formed in a frame 23, clearly shown in Figs. 6 and 7, forming an integral part of the supporting standards 21. At its upper end the locking rod 22 carries a clamping member 24 for releasably clamping the bracket arm 16 of the pump plunger rod to cause said locking rod to move in unison with the plunger rod. At its intermediate portion the locking rod 22 is provided with engaging notches 25 on opposite sides thereof to be engaged by a dog 26 on one side and a dog 27 on the other side, said dogs being pivotally mounted on the frame 23 and the former extending upwardly while the latter extends downwardly so as to effect a locking engagement with the locking rod 22 that will prevent its movement in either direction. A coil spring 28 serves to move dog 26 into its locking engagement with the locking rod 22 while a spring 29 does likewise with dog 27. There are a pair of cross bars 30 extending across the casing 20, and as here shown made integral therewith and bolted to the frame 23, and a rod 31 pivotally connected to the lower end of dog 27 passes through a slot in the frame 23 and rests on the lower cross bar 30 while the outwardly bent tail end of dog 26 also projects through this slot of the frame just above the rod 31.

A rocking frame is provided, which as shown in Fig. 3 consists of end pieces 32 connected by a cross piece 33, said end pieces at their lower ends being pivotally mounted on a rod 34 extending across the casing and having journaled in their upper ends a screw shaft 35 which is restrained in its turning movements by means of a pair of leaf springs 36 bearing on opposite sides thereof, said springs being mounted on the cross piece 33 as best shown in Fig. 6. A nut 37 is threaded on the screw shaft 35 and has a projecting arm 38, Fig. 7, pivotally connected in a slot of a swinging sliding plate or carriage 39 which is suspended from a rod 40 extending across the casing. The lower end of the plate 39 is bent inwardly to normally stand in the same vertical plane with the end of rod 31 and the tail end of dog 26 so as to engage therewith and be prevented thereby against a lateral movement of the carriage to the left of the position in which it is shown in Fig. 3. When the swinging frame, however, is swung to its outer position, as shown in Fig. 5, the lower end of the plate 39 is free from engagement with the rod 31 and the dog 26 so that said plate may be fed along the rod 40 by a turning movement of the screw shaft 35. In order to produce the turning movement of the screw shaft 35, a strap 41, preferably of light spring metal, is coiled around the screw shaft with its inner end secured thereto while its outer end passes out through the casing into a narrow box like upright extension 42 of the casing where it passes beneath a leaf spring 43 to keep it taut and then connects with a tape 44 extending through a tubular conduit 45 which extends overhead for any desirable distance to the location of the gage 46.

The pump mechanism is usually located outside of the building while the gage is contained within the building at the position of the weigher. The gage comprises a vertical slotted guide in the slot of which a runner 47 slides carrying a pointer 48 to travel over lines of graduations marked on either side of the guide, one series indicating the position of the slide for measuring skim milk and the other series indicating the position of the slide for measuring whey and the numbers of graduation lines in each instance indicating the number of pounds of whole milk for which the proper quantity of whey or skim milk is to be delivered. The tape 44 connects with the slide 47 so that as said slide is moved downwardly it draws the tape off of the screw shaft 35 turning said shaft to feed the carriage 39 by means of the engagement of its nut 37 with the threads of said shaft.

In order to produce the swinging movement of the rocking frame carrying the screw shaft, to avoid the engagement of the plate 39 with the rod 31 and the dog 26, and against the action of a spring 49 which holds said frame in its inner position, a link 50 is secured to one of the end pieces 32 and passing through an opening in the casing extension 42, Fig. 8, connects with one arm of the bell crank lever 51, the other arm of which has a cord 52, Fig. 1, extending from it through guides and pulleys on the tubular conductor 45 to a handle 53 suspended at the gage. When the handle 53 is pulled by the weigher the rocking frame is swung from the position in which it is shown in Fig. 4 to the position in which it is shown in Fig. 5.

The carriage 39 is set to an advanced position, first through its disengagement from the dog 26 and the rod 31 by a pull on the handle 53, and then driven by the turning movement of the screw shaft 35 caused by the pull on the tape 44 in the adjustment of the slide on the gage, and is then allowed to swing inwardly under the action of its spring 49 by releasing handle 53, the engagement of its inner face with the dog 26 and the rod 31 causing both dogs 26 and 27 to be disengaged from the locking rod 22 as shown in Fig. 7, and it is then returned to its normal position by the operation of the pump.

The locking rod 22 has an arm 54 secured to its lower end and passing through a guide slot formed between one of the standards 21 and a strip 55 secured thereto, and such arm is connected by means of a link 56 with an arm 57 adjustably mounted on a lever 58 which is pivotally mounted on a stud 59 extending from the frame 23. Said lever 58 also carries a series of stepped pawls 60 to engage the teeth of a ratchet 61 loosely mounted on the stud 59 and carrying a pinion 62 which in the inner position of the rocking frame meshes with a pinion 63 on the screw shaft 35. With the locking rod 22 disengaged by both dogs 26 and 27 the pump is free to be operated in the usual manner, but each stroke of the plunger rod 15 thereof moves the locking rod 22 an equal distance and through the connection of the link 56 such movement is caused to impart a rotation to the ratchet wheel 61 through the stepped pawls 60 and cause the turning of the screw shaft 35 to move the carriage 39 toward its normal position and to rewind the tape 41 on said shaft. As soon as the carriage 39 reaches its normal position, its end passing off from the ends of dog 26 and rod 31 permits them to spring outwardly and cause the reëngagement of both dogs with the locking rod and thereby lock the pump against further operation. Inasmuch as the extent of the feed of the carriage in one direction is determined by the extent of movement of the slide 47 on the gage, the extent of operation of the pump permitted during the return movement of the carriage until the pump is again locked will be proportionate to such movement of the slide, so that the volume of liquid issuing from the pump will be exactly measured. The graduations of the scale are so spaced that such volume will be proportionate to the quantity of whole milk indicated by the gage at the beginning of the pumping operation.

From the foregoing the operation of the invention will be clearly understood, the pump being normally locked against operation by the engagement of the dogs 26 and 27 with the locking rod 22 and only being unlocked when the weigher first pulls upon the handle 53 to swing the carriage 39 by means of the rocking frame beyond the plane of the dog 26 and the rod 31, such movement being permitted by the pivotal connection of the nut 37 with the carriage 39, and then the movement of the slide 47 on the gage causing the unreeling of the tape 41 to turn the screw shaft 35 and feed the carriage a distance depending upon the extent of movement of the slide 47, the handle 53 on being released by the weigher permitting the spring 49 to return the rocking frame to its normal position and thereby disengage both dogs 26 and 27 from the locking rod 22 by the lower end of the carriage 39 bearing against the end of dog 26 and the end of rod 31. The pump being unlocked is capable of operation in the usual manner and the stroke of the pump handle, whether it is a partial stroke or a full stroke, serves to produce a corresponding movement of the ratchet wheel 61 to turn the screw shaft 35 in the opposite direction from the direction in which it was turned by the tape 41, to feed the carriage toward its normal position and to rewind the tape 41. Immediately upon the carriage reaching its normal position the dogs 26 and 27 are released thereby and engage the locking rod 22 to prevent further operation of the pump. This locking engagement of the locking rod 22 may be performed at one of a number of places according to the positions of the notches 25 therein.

In order to increase or diminish the quantity of liquid permitted to be pumped at the respective adjustments of the gage the arm 57 may be changed in its position on the lever 58, and for material variations therein the pinion 62 may be substituted by another of different size, the stud 59 being adjustably mounted on the frame for that purpose, as shown in Fig. 5.

For convenient access to the parts the casing is shown as provided with a downwardly swinging door 64 and one side thereof is provided with a hinged door 65, both being secured by suitable locks to prevent tampering with the interior and a rod 66, shown in Fig. 2 passes through the casing and is locked in position by the closing of door 65 with its end entering a socket 67 in the cap 12 of the pump to prevent said cap being lifted or turned from the cylinder of the pump for the purpose of freeing the arm 16 from the locking rod 22 and thereby permitting the operation of the pump independent of the locking mechanism. When, however, it is desired to clean the pump it is only necessary to unlock the door 65 and withdraw the rod 66 from the socket 67, when the cap 12 may be released from its clamping bolts 13 and the arm 16 may be disengaged from the locking rod 22 by opening the clamp 24 and the cap with the plunger may be removed from the cylinder of the pump.

I desire it to be understood that this invention is not limited to any specific form or arrangement of parts except in so far as such limitations are specified in the claims.

What I claim as my invention is;

1. The combination with a pump plunger of means for locking the plunger, a screw shaft by means of which said locking means is moved into and out of its locking position, a driving connection for the screw shaft operated by the movements of the pump plunger, means for disengaging the screw shaft from the driving means, and a tape wound around the screw shaft and adapted to turn the same when drawn off therefrom while the screw shaft is out of connection with the driving means.

2. The combination with a pump plunger of a locking means for the pump plunger, a sliding plate adapted to release the locking means, a rocking frame, a screw shaft carried thereby, a nut connected with the sliding plate and threaded on the screw shaft, a driving connection between the pump plunger and the screw shaft, means for swinging the locking frame to disengage the driving connection from the screw shaft, and a tape wound upon the screw shaft and adapted when unreeled therefrom at the time the driving connection is disengaged to feed the sliding plate along the screw shaft a distance dependent upon the amount of tape drawn off and thereby permit of a degree of pumping operation dependent upon the distance said plate is fed and through which it will be returned by the pumping action through the driving connection to its position for releasing the locking means.

3. The combination with a pump plunger of a locking means for the pump plunger, a swinging sliding plate adapted to release the locking means, a spring actuated rocking frame, a screw shaft carried thereby, a nut connected with the sliding plate and threaded on the screw shaft, a driving connection between the pump plunger and the screw shaft, means for swinging the rocking frame against the action of its spring to disengage the driving connection from the screw shaft and for swinging the sliding plate out of the path of engagement with the locking means, and a tape wound upon the screw shaft and adapted when unreeled therefrom at the time the driving connection is disengaged to feed the sliding plate along the screw shaft a distance dependent upon the amount of tape drawn off and thereby permit of a degree of pumping operation dependent upon the distance said plate is fed and through which it will be returned by the pumping action through the driving connection to its position for releasing the locking means.

4. The combination with a pump plunger of a sliding locking rod connected therewith and provided with engaging notches on opposite sides thereof, a pair of dogs for engaging the notches in the locking rod, a swinging sliding plate, a spring retracted rocking frame, a screw shaft mounted in the rocking frame, a nut threaded on the screw shaft and pivotally connected with the sliding plate, a rod connected with one of the dogs and extending with the end of the other dog in a position to be engaged by the swinging plate when it is moved out of its normal position, means for swinging the rocking frame against the action of its spring to carry the sliding plate out of its plane of engagement with the dog and the rod, a tape wound upon the screw shaft and adapted to turn the same when drawn therefrom for feeding the plate by means of the nut a distance corresponding to the length of tape drawn off, said plate, when so adjusted and the means for swinging the rocking frame is released, serving to engage the dog and rod and thereby release the dogs from the locking rod, and a driving connection between the pump plunger and the screw shaft for turning the screw shaft and restoring the sliding plate to its normal position for locking the pump when a predetermined degree of operation of the pump has been made, depending upon the length of travel of the sliding plate.

5. The combination with a pump plunger of means for locking the plunger, a screw shaft by means of which said locking means is moved into and out of its locking position, a driving connection for the screw shaft operated by the movements of the pump plunger, means for disengaging the screw shaft from the driving means, and a variable controlling means for turning the screw shaft when it is disengaged from the driving connection for determining the extent of operation of the pump permitted while the locking means is being moved to its locking position by the operation of the pump.

6. In a measuring pump, a cylinder, a cap therefor, a plunger rod passing through the cap, a locking means for the plunger rod contained within the casing, a locked door controlling access to the casing, and a locking pin passing through the casing and engaging the cap and held in position by the locked door, whereby the removal of the cap from the cylinder of the pump is prevented.

7. A measuring pump, comprising a pump cylinder, a pedestal on which the cylinder is mounted, a plunger working in the cylinder having a plunger rod, a pump handle having connection with the plunger rod, an arm integral with the handle connection of the plunger rod, a casing supported from the pump pedestal, a locking rod passing through the casing and having releasable connection with the arm, and an adjustable locking means contained within the casing for controlling the degree of operation of the pump.

8. The combination with a pump having a cylinder and a plunger and an operating handle, of a casing connected with the pump, a locking rod slidable through the casing, an arm connecting the locking rod with the plunger rod of the pump, locking means within the casing to engage the locking rod and prevent the operation of the pump, a swinging sliding plate within the casing for disengaging the locking means from the locking rod, a spring retracted rocking frame within the casing, a screw shaft mounted thereon and having connection with the sliding plate for swinging and sliding the same, a bell crank lever pivotally mounted on the casing and connected with the rocking frame for swinging it, a ratchet driving connection within the casing connected to the locking rod and comprising intermeshing pinions, one of which is mounted on the screw shaft and meshes with the other in the normal position of the rocking frame, a tape wound about the screw shaft for turning the same when it is drawn off therefrom, a tubular conduit for the tape extending from the casing to a distance therefrom, a graduated gage, a slide mounted thereon and connected with the end of the tape, and a connection from the bell crank lever to the gage for permitting the swinging of the rocking frame to be performed at a distance at which distance the tape may be operated to draw it off from the screw shaft to a measured extent.

In testimony whereof, I affix my signature, in presence of two witnesses.

JOHN ALBRECHT.

Witnesses:
F. B. KUEHL,
Jos. G. WALECKA.